US012400343B2

(12) United States Patent
Imagawa et al.

(10) Patent No.: US 12,400,343 B2
(45) Date of Patent: Aug. 26, 2025

(54) INFORMATION PROCESSING METHOD, INFORMATION PROCESSING DEVICE, AND INFORMATION PROCESSING SYSTEM FOR MEASURING DISPLACEMENT IN A STRUCTURE

(71) Applicant: Panasonic Intellectual Property Management Co., Ltd., Osaka (JP)

(72) Inventors: Taro Imagawa, Osaka (JP); Yuki Maruyama, Osaka (JP); Hiroya Kusaka, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 350 days.

(21) Appl. No.: 18/134,256

(22) Filed: Apr. 13, 2023

(65) Prior Publication Data

US 2023/0252650 A1 Aug. 10, 2023

Related U.S. Application Data

(63) Continuation of application No. PCT/JP2021/016537, filed on Apr. 23, 2021.

(30) Foreign Application Priority Data

Oct. 26, 2020 (JP) .................................. 2020-178620

(51) Int. Cl.
*G06T 7/246* (2017.01)
*G01B 11/00* (2006.01)

(52) U.S. Cl.
CPC .... *G06T 7/248* (2017.01); *G06T 2207/30184* (2013.01)

(58) Field of Classification Search
CPC .......... G06T 7/248; G06T 2207/30184; G06T 2207/20021; G06T 7/246; G01B 11/00
See application file for complete search history.

(56) References Cited

U.S. PATENT DOCUMENTS

| | | | | |
|---|---|---|---|---|
| 2014/0168422 A1* | 6/2014 | Feng | ...................... | H04N 23/51 382/106 |
| 2017/0116768 A1* | 4/2017 | Yen | ......................... | G06T 7/337 |
| 2020/0393289 A1 | 12/2020 | Ohta et al. | | |

FOREIGN PATENT DOCUMENTS

WO 2019/097576 5/2019

OTHER PUBLICATIONS

International Search Report (ISR) issued on Jul. 6, 2021 in International (PCT) Application No. PCT/JP2021/016537.

* cited by examiner

*Primary Examiner* — Siamak Harandi
(74) *Attorney, Agent, or Firm* — Wenderoth, Lind & Ponack L.L.P.

(57) ABSTRACT

An information processing method includes: obtaining training images generated by a camera shooting a target point and training parameters related to a position/orientation of the camera when shooting the training images; generating, using the training parameters as inputs, a model that outputs a first displacement amount by which a target block corresponding to the target point displaces from a reference position in the training images; obtaining measurement images generated by the camera shooting the target point and measurement parameters related to the position/orientation of the camera when shooting the measurement images; obtaining a second displacement amount, output by inputting the measurement parameters into the model, by which a target block corresponding to the target point appearing in the measurement images displaces from a reference position in the measure- (Continued)

ment images; and outputting a displacement obtained by subtracting the second displacement amount from displacement of the target block in the measurement images.

14 Claims, 9 Drawing Sheets

INFORMATION PROCESSING METHOD, INFORMATION PROCESSING DEVICE, AND INFORMATION PROCESSING SYSTEM FOR MEASURING DISPLACEMENT IN A STRUCTURE

CROSS REFERENCE TO RELATED APPLICATIONS

This is a continuation application of PCT International Application No. PCT/JP2021/016537 filed on Apr. 23, 2021, designating the United States of America, which is based on and claims priority of Japanese Patent Application No. 2020-178620 filed on Oct. 26, 2020. The entire disclosures of the above-identified applications, including the specifications, drawings and claims are incorporated herein by reference in their entirety.

FIELD

The present disclosure relates to an information processing method, an information processing device, and an information processing system.

BACKGROUND

There is a technique for measuring displacement in a structure such as a bridge using images captured of the structure (see Patent Literature (PTL) 1).

CITATION LIST

Patent Literature

PTL 1: International Publication No. 2019/097576

SUMMARY

Technical Problem

However, there is a problem in that when the camera used for the shooting vibrates, the shot image may be blurry or displaced, which may interfere with the measurement of the displacement in the structure.

Accordingly, the present disclosure provides an information processing method and the like that more appropriately measure displacement in a structure.

Solution to Problem

An information processing method according to one aspect of the present disclosure includes: obtaining a plurality of first images generated by a camera shooting a target point from a plurality of positions and orientations, and a plurality of first parameters related to a position and an orientation of the camera when shooting each of the plurality of first images; generating, using the plurality of first parameters as inputs, a model that outputs a first displacement amount by which a target block corresponding to the target point appearing in each of the plurality of first images is displaced from a reference position in the plurality of first images; obtaining a plurality of second images generated by the camera shooting the target point, and a plurality of second parameters related to a position and an orientation of the camera when shooting each of the plurality of second images; obtaining a second displacement amount by which a target block corresponding to the target point appearing in the plurality of second images is displaced from a reference position in the plurality of second images, the second displacement amount being output by inputting the plurality of second parameters for corresponding ones of the plurality of second images into the model; and outputting a displacement obtained by subtracting the second displacement amount from displacement of the target block in the plurality of second images.

Note that these comprehensive or specific aspects may be realized by a system, a device, an integrated circuit, a computer program, or a computer-readable recording medium such as a CD-ROM, or may be implemented by any desired combination of systems, devices, integrated circuits, computer programs, and recording media.

Advantageous Effects

The information processing method of the present disclosure can more appropriately measure displacement in a structure.

BRIEF DESCRIPTION OF DRAWINGS

These and other advantages and features will become apparent from the following description thereof taken in conjunction with the accompanying Drawings, by way of non-limiting examples of embodiments disclosed herein.

Figure 1:
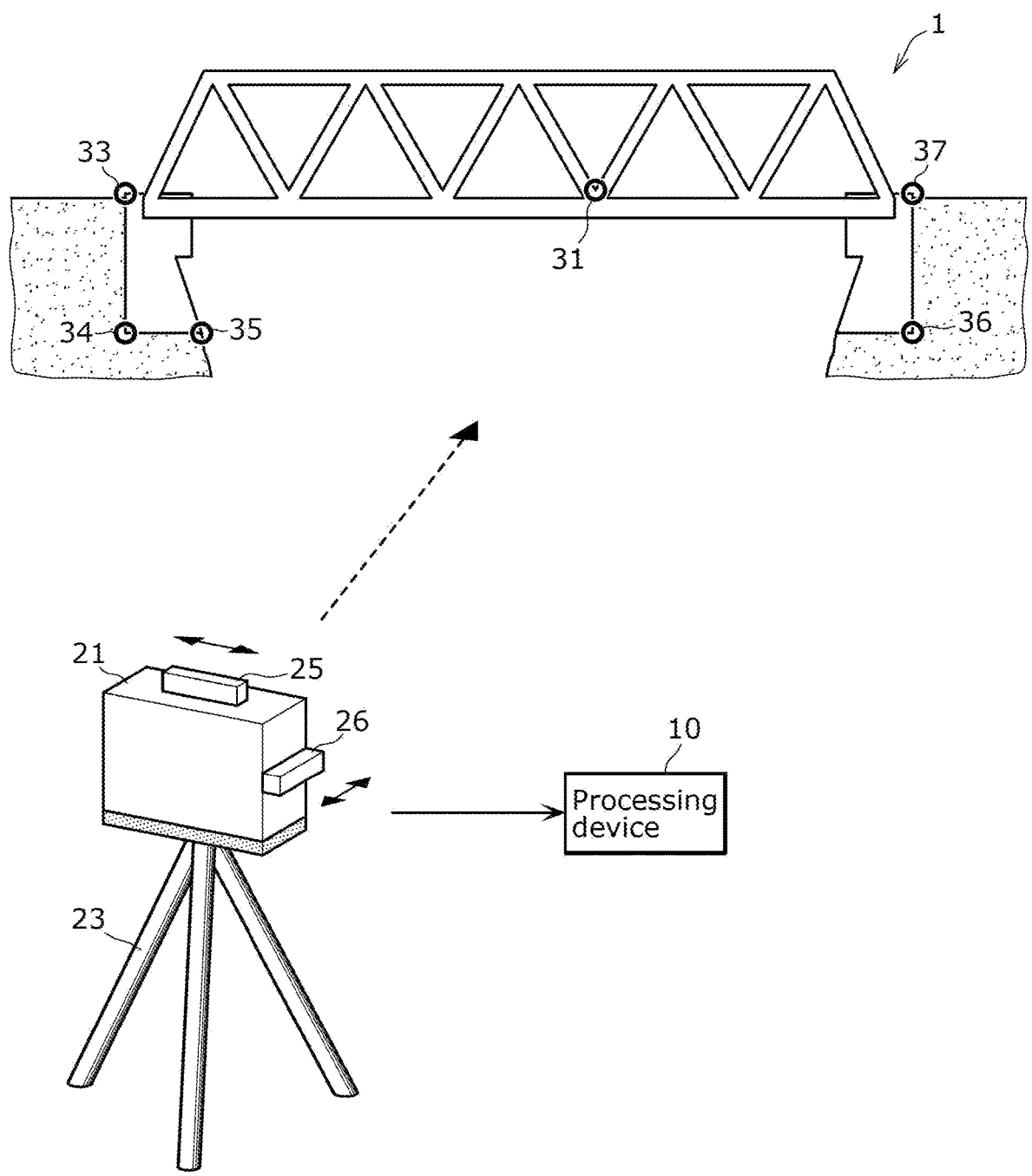
FIG. 1 is a schematic diagram illustrating the measurement of displacement in a structure by a processing device according to an embodiment.

DESCRIPTION OF EMBODIMENTS (Underlying Knowledge Forming Basis of the Present Disclosure)

The inventors of the present disclosure discovered that the technique for measuring displacement in a structure described above in the Background section has the following problems.

There is a technique for inspecting a structure such as a bridge using images shot of the structure from a distance by a high-precision camera. Measuring displacement using images has an advantage of enabling the measurement of a plurality of points simultaneously in a non-contact manner, and can therefore contribute to a reduction in labor required for measurement tasks in the maintenance and management of infrastructure, reduction of the equipment and power required for the measurement tasks, and a reduction in the time required.

Vibrations or positional shifts (called "vibrations or the like" hereinafter) may arise in the camera as a result of the camera or a support member supporting the camera (e.g., a tripod) being hit or pushed by an object or a fluid (a liquid or a gas). When such vibrations or the like are occurring, the position of the subject appearing in the image shot by the camera will shift from the position of the subject when shot by the camera when there are no vibrations or the like. If such an image is used to measure the displacement in the structure, the measurement result will be incorrect.

In this manner, there is a problem in that when the camera used for the shooting vibrates, a positional shift will arise in the shot image, which may interfere with the measurement of the displacement in the structure.

Accordingly, the present disclosure provides an information processing method and the like that more appropriately measure displacement in a structure.

An information processing method according to one aspect of the present disclosure includes: obtaining a plurality of first images generated by a camera shooting a target point from a plurality of positions and orientations, and a plurality of first parameters related to a position and an orientation of the camera when shooting each of the plurality of first images; generating, using the plurality of first parameters as inputs, a model that outputs a first displacement amount by which a target block corresponding to the target point appearing in each of the plurality of first images is displaced from a reference position in the plurality of first images; obtaining a plurality of second images generated by the camera shooting the target point, and a plurality of second parameters related to a position and an orientation of the camera when shooting each of the plurality of second images; obtaining a second displacement amount by which a target block corresponding to the target point appearing in the plurality of second images is displaced from a reference position in the plurality of second images, the second displacement amount being output by inputting the plurality of second parameters for corresponding ones of the plurality of second images into the model; and outputting a displacement obtained by subtracting the second displacement amount from displacement of the target block in the plurality of second images.

According to this aspect, the model can be generated using images actually shot by the camera and the parameters used during the shooting, and the position of the target block corresponding to the target point can be corrected and output using the generated model. The target point is a point at which the displacement is measured. The model is a model that, when the position and the orientation of the camera during shooting are specified, outputs the displacement amount of the target block for a case where the target block is shot by the camera at the specified position and orientation. The processing for generating the model and processing for outputting the displacement amount using the model do not require complex geometric calculations that take into account the position and orientation of the camera, and can be realized, for example, by relatively simple algebraic calculations. This can contribute to a reduction in the resources and power consumption of computers involved in obtaining the displacement amount of the target block and the like. Thus according to this information processing method, displacement in a structure can be more appropriately measured.

For example, a plurality of reference points may appear in each of the plurality of first images; each of the plurality of first images may include a plurality of reference blocks corresponding one-to-one to the plurality of reference points appearing in the first image; the plurality of first parameters may include a displacement of the plurality of reference blocks in the plurality of first images; the plurality of reference points may appear in the plurality of second images; each of the plurality of second images may include a plurality of reference blocks corresponding to the plurality of reference points appearing in the second image; and the plurality of second parameters may include a displacement of the plurality of reference blocks in the plurality of second images.

According to this aspect, the displacement amount of the target block can be corrected using, as parameters, the positions of the reference blocks corresponding to the reference points appearing in the image along with the target point. The reference points are points serving as a reference when measuring displacement. Accordingly, there is no need to obtain information aside from the image in order to correct the displacement amount of the target block, or in other words, the information required for the correction can be reduced. Thus according to this information processing method, displacement in a structure can be more appropriately measured based on less information.

For example, the plurality of first parameters may include displacement data or angular velocity data of the camera obtained when the camera shoots each of the plurality of first images, the displacement data or the angular velocity data being obtained from an output value of a displacement sensor or a gyrosensor fixed to the camera; and the plurality of second parameters may include displacement data or angular velocity data of the camera obtained when the camera shoots the plurality of second images, the displacement data or the angular velocity data being obtained from an output value of the displacement sensor or the gyrosensor.

According to this aspect, the displacement amount of the target block can be corrected using, as a parameter, the displacement amount or angular velocity of the camera measured by the sensor. In this case, the reference points are not used to correct the displacement amount of the target block, and thus there is an advantage in that the method can be executed even when a suitable reference point cannot be set in the image. Thus according to this information processing method, displacement in a structure can be measured more appropriately even if a suitable reference point cannot be set in the image.

For example, when obtaining the plurality of first images, the plurality of first images may be obtained by the camera by generating the plurality of first images by sequentially shooting the target point when the position of the camera is changing within a predetermined distance from the reference position or when the orientation of the camera is changing within a predetermined angle from a reference orientation.

According to this aspect, the model can be generated using images shot sequentially by the camera when the position and orientation of the camera are changing, and the parameters from when that shooting is performed. At this time, the position and orientation of the camera are within a predetermined range from the reference position and a reference orientation, respectively, and thus positional shift of the target point in the image can be kept relatively low, and the accuracy of the displacement amount output by the model can be improved. Thus according to this information processing method, displacement in a structure can be more appropriately measured at a higher level of accuracy.

For example, when generating the plurality of first images, the plurality of first images may be generated by sequentially shooting the target point while the position and the orientation of the camera are oscillating.

According to this aspect, the model can be generated using images shot sequentially by the camera when the position and orientation of the camera are oscillating, and the parameters from when that shooting is performed. At this time, the position and orientation of the camera are oscillating, and thus positional shift of the target point in the image can be kept relatively low while also increasing the reproducibility thereof, and the accuracy of the displacement amount output by the model can be improved. Thus according to this information processing method, displacement in a structure can be more appropriately measured at a higher level of accuracy.

For example, the plurality of first images may be generated by applying a vibration to the camera using a vibration device fixed to the camera and shooting the target point when the position and the orientation of the camera are oscillating based on the vibration applied to the camera.

According to this aspect, oscillations in the position and the orientation of the camera can be imparted by the vibration device. As such, the camera does not need to be vibrated by other means, which makes it possible to vibrate the camera more easily and effectively and correct the displacement amount of the target block. Thus according to this information processing method, displacement in a structure can be more appropriately measured more easily.

For example, when applying the vibration to the camera, the vibration device may apply a vibration including a component of movement in three directions orthogonal to each other and a component of rotation about three axes orthogonal to each other.

According to this aspect, the vibration device applies, to the camera, a vibration that includes all components of movement and rotation that can occur in a three-dimensional space, which makes it possible to generate a model capable of outputting the displacement amount of the target block when a variety of vibrations arise and correct the displacement amount of the target block with a higher level of accuracy. Thus according to this information processing method, displacement in a structure can be more appropriately measured at a higher level of accuracy.

For example, when obtaining the plurality of first parameters, the plurality of first parameters may be obtained when the vibration device is applying the vibration to the camera, without obtaining the plurality of first parameters when the vibration device is not applying the vibration to the camera.

According to this aspect, by not obtaining the parameters from when the vibration device is not applying vibrations to the camera, which have a relatively low contribution to the generation of the model, the amount of information to be obtained can be reduced, and by extension, the required storage capacity of a storage device can be reduced. As such, according to this information processing method, the measurement of displacement in a structure can be implemented using a smaller storage device.

For example, when the vibration is applied to the camera by the vibration device, a vibration having a specific amplitude or a specific frequency may be applied; and when obtaining the plurality of first parameters, of oscillations in the position and oscillations in the orientation of the camera, oscillations in the position and oscillations in the orientation at the specific amplitude or the specific frequency may be extracted and obtained.

According to this aspect, a model capable of outputting the displacement amount of the target block is generated using vibrations of a specific amplitude or a specific frequency. Even if vibrations different from the specific amplitude or the specific frequency occur in the structure or camera, a model can be generated that corrects the displacement amount of the target block without being affected by those vibrations. Thus according to this information processing method, displacement in a structure can be more appropriately measured even when the structure or the camera is vibrating.

For example, a plurality of reference point candidates may appear in each of the plurality of first images, and each of the plurality of first images may include a plurality of reference block candidates corresponding to the plurality of reference point candidates appearing in the first image. Furthermore, the generating of the model may include: generating a plurality of trial models for the model using the plurality of first images including, as the plurality of reference blocks, a plurality of trial reference block groups selected in a plurality of selection patterns from the plurality of reference block candidates; and generating a trial model, among the plurality of trial models generated, having a smallest degree of error in the first displacement amount output, as the model.

According to this aspect, a greater number of reference point candidates than the reference points actually used can be set, and the displacement amount of the target block can be corrected by selecting and using a model having a smaller degree of error when the model is generated. Thus according to this information processing method, displacement in a structure can be more appropriately measured at a higher level of accuracy.

For example, a plurality of reference points may appear in a plurality of third images shot by a second camera having a position and an orientation that change together with the position and the orientation of a first camera, the first camera being the camera, and the plurality of third images being shot simultaneously with the plurality of first images shot by the first camera; each of the plurality of third images may include a plurality of reference blocks corresponding one-to-one to the plurality of reference points appearing in the third image; the plurality of parameters may include positions of the plurality of reference blocks in the third image; the plurality of reference points may appear in the plurality of second images; each of the plurality of second images may include a plurality of reference blocks corresponding to the plurality of reference points appearing in the second image; and the plurality of second parameters may include positions of the plurality of reference blocks in the second image.

According to this aspect, a model capable of outputting the displacement amount of the target block can be generated by using a plurality of cameras whose positions and orientations change together, and using reference blocks included in the images generated by the plurality of cameras. The plurality of cameras may have different shooting parameters. As such, by effectively using a plurality of cameras, reference points can be set at various positions, which makes it possible to improve the accuracy. Thus according to this information processing method, displacement in a structure can be more appropriately measured at a higher level of accuracy.

Additionally, an information processing method according to one aspect of the present disclosure includes: obtaining a plurality of first images generated by a camera shooting a target point from a plurality of positions and orientations, and a plurality of first parameters related to a position and an orientation of the camera when shooting each of the plurality of first images; generating, using the plurality of first parameters as inputs, a model that outputs a first displacement amount by which a target block corresponding to the target point appearing in each of the plurality of first images is displaced from a reference position in the plurality of first images; obtaining a plurality of second images generated by the camera shooting the target point, and a plurality of second parameters related to a position and an orientation of the camera when shooting each of the plurality of second images; obtaining a second displacement amount by which a target block corresponding to the target point appearing in each of the second images is displaced from a reference position in the second image, the second displacement amount being output by inputting the plurality of second parameters into the model; and outputting a position obtained by subtracting the second displacement amount from a position of the target block in the plurality of second images.

According to this aspect, the model can be generated using images actually shot by the camera and the parameters used during the shooting, and the position of the target block corresponding to the target point can be corrected and output using the generated model. The target point is a point at which the displacement is measured. The model is a model that, when the position and the orientation of the camera during shooting are specified, outputs the displacement amount of the target block for a case where the target block is shot by the camera at the specified position and orientation. The processing for generating the model and processing for outputting the displacement amount using the model do not require complex geometric calculations that take into account the position and orientation of the camera, and can be realized, for example, by relatively simple algebraic calculations. This can contribute to a reduction in the resources and power consumption of computers involved in obtaining the displacement amount of the target block and the like. Thus according to this information processing method, the position of a structure can be more appropriately measured.

Additionally, an information processing device according to one aspect of the present disclosure includes an obtainer, a generator, and an outputter. The obtainer obtains a plurality of first images generated by a camera shooting a target point from a plurality of positions and orientations, and a plurality of first parameters related to a position and an orientation of the camera when shooting each of the plurality of first images; the generator generates, using the plurality of first parameters as inputs, a model that outputs a first displacement amount by which a target block corresponding to the target point appearing in each of the plurality of first images is displaced from a reference position in the plurality of first images; the obtainer further obtains a second image generated by the camera shooting the target point, and a plurality of second parameters related to a position and an orientation of the camera when shooting the second image; and the outputter obtains a second displacement amount by which a target block corresponding to the target point appearing in the plurality of second images is displaced in the plurality of second images, the second displacement amount being output by inputting the plurality of second parameters into the model, and outputs a displacement obtained by subtracting the second displacement amount from a displacement of the target block in the plurality of second images.

This aspect provides the same effects as the foregoing information processing method.

Additionally, an information processing system according to one aspect of the present disclosure includes: the above-described information processing device; the camera that generates the plurality of first images and the plurality of second images; and a vibration device that is fixed to the camera and that applies a vibration to the camera.

According to this aspect, the same effects as those of the foregoing information processing method can be achieved by the vibration device applying vibrations to the camera.

Note that these comprehensive or specific aspects may be realized by a system, a device, a method, an integrated circuit, a computer program, or a computer-readable recording medium such as a CD-ROM, or may be implemented by any desired combination of systems, devices, methods, integrated circuits, computer programs, or recording media.

Embodiments will be described in detail hereinafter with reference to the drawings.

Note that the following embodiments describe comprehensive or specific examples of the present disclosure. The numerical values, shapes, materials, constituent elements, arrangements and connection states of constituent elements, steps, orders of steps, and the like in the following embodiments are merely examples, and are not intended to limit the present disclosure. Additionally, of the constituent elements in the following embodiments, constituent elements not denoted in the independent claims, which express the broadest interpretation, will be described as optional constituent elements.

Embodiment

An information processing device and the like that more appropriately measure displacement in a structure will be described in the present embodiment.

FIG. 1 is a schematic diagram illustrating the measurement of displacement in a structure according to the present embodiment.

FIG. 1 illustrates bridge 1, camera 21 that shoots an image of bridge 1 from a distance, and processing device 10. "From a distance" refers to a point several tens to several hundreds of meters from bridge 1, for example, but is not limited thereto.

Bridge 1 is a bridge fixed to the ground surface, and is an example of a structure. Bridge 1 includes bridge piers extending from within the ground to above the ground, and bridge girders supported by the bridge piers. Bridge 1 is a subject of displacement measurement by processing device 10 according to the present embodiment. Note that the structure for which displacement is measured by processing device 10 according to the present embodiment is not limited to bridge 1, and may be a building, a steel tower, a statue, another type of tower, or the like.

It is assumed that the part of bridge 1 that is fixed to the ground surface (e.g., the bridge piers) do not displace relative to the ground surface, but that the part distanced from the ground surface (e.g., the bridge girders) displaces relative to the ground surface. A relative displacement amount of the bridge girders relative to the ground surface arises, for example, when external force acts on bridge 1, resulting in deformation (specifically, flexing, sagging, or the like) of the steel frame or concrete or the like constituting bridge 1. For example, when an automobile or a train passes over the bridge girders, the weight of the automobile or train causes an external force to displace the bridge girders downward. In addition, earthquakes or strong winds act to displace the bridge girders in various directions.

Here, the point at which displacement is measured in bridge 1 will be called a "target point". A point of bridge 1 assumed not to displace relative to the ground surface will be called a "reference point". In FIG. 1, one target point 31 and five reference points 33, 34, 35, 36, and 37 are set. Note that it is necessary to set a plurality of reference points, and the greater the number of reference points is, the better the accuracy of measuring the displacement of the target point will become. The target point may be set to any desired number that is at least 1. The displacement of each of the one or more target points is measured using a plurality of reference points.

Camera 21 is an image capturing device that generates an image in which bridge 1 appears by capturing an image of bridge 1. Camera 21 is supported by tripod 23, which is fixedly placed on the ground surface. The material of tripod 23 is a synthetic resin, metal, or the like. A time interval at which camera 21 shoots is, for example, no greater than about 0.1 seconds. Camera 21 provides the generated image to processing device 10.

When an external force acts on camera 21 or tripod 23 when camera 21 captures an image of bridge 1, camera 21 may vibrate or the like based on flexing, vibration, or the like of tripod 23. When camera 21 vibrates during shooting, displacement occurs in bridge 1 appearing in the generated image, which prevents the displacement in bridge 1 from being measured accurately. It is therefore necessary to suppress the effect of displacement in bridge 1 in the image on the measurement result based on vibrations and the like arising in camera 21 during shooting.

Vibration devices 25 and 26 are fixedly installed in camera 21. Vibration devices 25 and 26 are devices that vibrate camera 21. Vibration devices 25 and 26 are vibration devices that use solenoid coils, for example.

The vibration of camera 21 by vibration devices 25 and 26 can include components of movement in various directions, or components of rotation about various axes. The vibration of camera 21 by vibration devices 25 and 26 includes, for example, components of movement in three directions orthogonal to each other and components of rotation about three axes orthogonal to each other. Vibration devices 25 and 26 can be used in processing executed by processing device 10 to suppress the effects of vibrations and the like arising in camera 21. Although a case where two vibration devices are installed is described as an example, there may be one, or three or more, vibration devices installed.

Note that vibration devices 25 and 26 are not absolutely necessary. If it is possible to vibrate camera 21, camera 21 may be vibrated by causing a suitable object or fluid to collide with camera 21, rather than using vibration devices 25 and 26. A person lightly tapping camera 21 with their finger may be used to vibrate camera 21.

Processing device 10 is an information processing device that measures displacement in bridge 1. Processing device 10 obtains an image generated by camera 21 capturing an image, and measures displacement in bridge 1 based on the obtained image. At this time, processing device 10 performs correction processing for suppressing displacement of the target point in the image based on vibration and the like of camera 21 during shooting, using the displacement amount of the target point and reference points appearing in the image. Through this, processing device 10 measures the displacement of the target point for which displacement based on the vibrations and the like in camera 21 during shooting has been suppressed, i.e., displacement in bridge 1.

The functions of processing device 10 will be described in further detail hereinafter.

Figure 2:
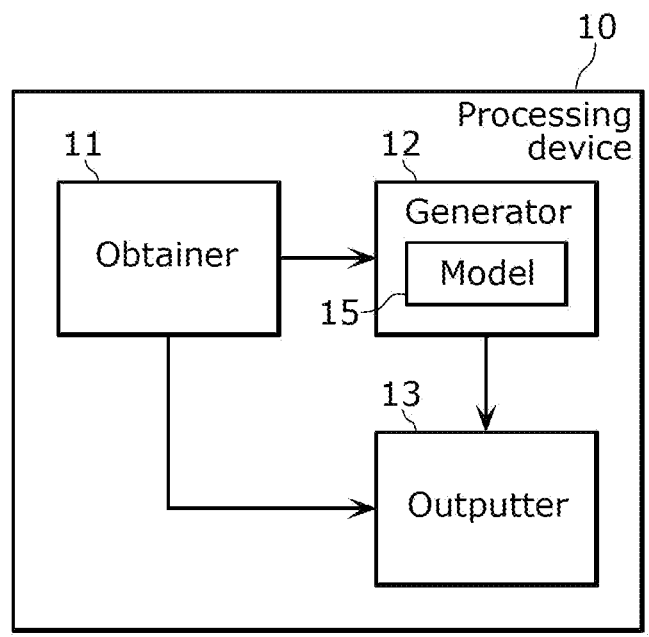
FIG. 2 is a block diagram illustrating the functional configuration of the processing device according to the embodiment.

FIG. 2 is a block diagram illustrating the functional configuration of processing device 10 according to the present embodiment.

As illustrated in FIG. 2, processing device 10 includes obtainer 11, generator 12, and outputter 13. These functional units can be realized by a processor (e.g., a Central Processing Unit (CPU), not shown) provided in processing device 10 executing a predetermined program using a memory (not shown).

Obtainer 11 is a functional unit that obtains an image generated by shooting bridge 1, and a plurality of parameters related to the position and orientation of camera 21 when the image is captured. Obtainer 11 obtains the image and the plurality of parameters in a training period and a measurement period. Here, the training period is a period for calculating the displacement amount of the target point, which is used in correction processing performed during the measurement period. The measurement period is a period in which the displacement of the target point is measured and the measured displacement is corrected using the displacement amount of the target point calculated in the training period.

In addition, obtainer 11 specifies a part of the obtained image that is of a predetermined size, and in which the target point appears, as a target block, and specifies a part of the obtained image that is of a predetermined size, and in which the reference point appears, as a reference block. The processing for specifying the target block in the image is performed by specifying a point at which the target point appears based on features around the target point appearing in the shot image, and specifying a part of a predetermined size that includes that point, and can be realized through a known technique. The same applies to the reference point and the reference block.

Specifically, during the training period, obtainer 11 obtains a plurality of images generated by camera 21 shooting a target point from a plurality of positions and orientations (also called "training images" or "first images"), and a plurality of parameters related to the positions and orientations of camera 21 when shooting each of the plurality of training images (also called "training parameters" or "first parameters"). Although a case where the plurality of training images are some of the plurality of images shot by camera 21 will be described as an example, the plurality of training images may be all of the plurality of images shot by camera 21. The interval between times when the plurality of training images are shot is approximately 0.1 seconds to 0.01 seconds, for example.

Here, a plurality of reference points appear in each of the plurality of training images. Each of the plurality of training images includes a plurality of reference blocks corresponding one-to-one to the plurality of reference points appearing in the training images. The plurality of training parameters include the positions of the plurality of reference blocks in the training images. The position of a reference block in a training image is, for example, x and y coordinates in a two-dimensional coordinate system. The same applies hereinafter.

Tripod 23 is fixed to the same position on the ground surface when camera 21 obtains the plurality of training images. The position and orientation of camera 21 in a state where no external force acts on camera 21 and tripod 23 are also referred to as a "reference position" and a "reference orientation" of camera 21, respectively. Then, camera 21 obtains the plurality of training images by generating a plurality of training images by sequentially shooting the target point, for example, when the position of camera 21 is changing within a predetermined distance from the reference position, or when the orientation of camera 21 is changing within a predetermined angle from the reference orientation.

This also includes shooting when both the position of camera 21 is changing within a predetermined distance from the reference position and the orientation of camera 21 is changing within a predetermined angle from the reference orientation.

More specifically, when generating the plurality of training images, camera 21 generates the plurality of training images by sequentially shooting the target point when the position and orientation of camera 21 are oscillating.

As one example, the oscillations in the position and orientation of camera 21 are vibrations applied by vibration devices 25 and 26. In other words, when camera 21 generates the plurality of training images, vibration devices 25 and 26 fixed to camera 21 impart vibrations on camera 21, and the images are generated by shooting the target point while the position and orientation of camera 21 are oscillating due to the vibrations imparted on camera 21. Although a case where the vibration devices that vibrate camera 21 are vibration devices 25 and 26 is described as an example, the vibration devices are not limited thereto. Only one of vibration devices 25 and 26 may be used, or if three or more vibration devices are provided, the three or more vibration devices may vibrate camera 21. The vibration may be a vibration that does not vary depending on the vibration device.

Note that obtainer 11 may obtain the plurality of training parameters when camera 21 is being vibrated by vibration devices 25 and 26, without obtaining the plurality of training parameters when camera 21 is not being vibrated by vibration devices 25 and 26. In other words, obtainer 11 may obtain the plurality of training parameters only when vibration devices 25 and 26 are vibrating camera 21.

Additionally, during the measurement period, obtainer 11 obtains a plurality of images generated by camera 21 shooting the target point (also called "measurement images" or "second images"), and a plurality of measurement parameters related to the positions and orientations of camera 21 when shooting each of the measurement images.

Here, a plurality of reference points appear in each of the plurality of measurement images. Each measurement image includes a plurality of reference blocks corresponding to the plurality of reference points appearing in the measurement image. The plurality of measurement parameters include the positions of the plurality of reference blocks in the measurement image.

When camera 21 shoots the measurement image, tripod 23 is fixed in the same position as when shooting the plurality of training images. Note that the timing at which camera 21 shoots the measurement image may be before shooting the plurality of training images, after shooting the plurality of training images, or between shots of the plurality of training images.

Generator 12 is a functional unit that generates model 15. Model 15 is a model that outputs a displacement amount (also called a "first displacement amount") by which a target block corresponding to a target point appearing in each of the plurality of training images is displaced from the reference position in each of the training images, taking the plurality of training parameters as inputs.

Outputter 13 is a functional unit that corrects the displacement of the target block in the measurement image and outputs a corrected displacement. Specifically, outputter 13 obtains a displacement amount (also called a "second displacement amount") by which the target block corresponding to the target point appearing in the measurement image is displaced from the reference position, produced by oscillation of camera 21 in the measurement image, the displacement amount being output by inputting the plurality of measurement parameters into model 15. The second displacement amount indicates a displacement amount from the reference position of the target point in the measurement image, and indicates an amount by which the target block is estimated to displace if camera 21 shoots at the position and orientation of camera 21 from when the measurement image is shot.

Additionally, outputter 13 outputs a displacement obtained by subtracting the second displacement amount from the displacement of the target block in the measurement image. Here, the operation of subtracting the second displacement amount from the displacement of the target block in the measurement image corresponds to "correction". The displacement amount in the measurement image, which corresponds to the actual displacement amount of bridge 1, is obtained by subtracting the second displacement amount from the displacement of the target block in the measurement image. Note that the actual displacement amount of bridge 1 can be calculated by applying well-known computational processing (e.g., processing such as multiplying by a predetermined coefficient) to the displacement amount in the measurement image obtained as described above.

Details of processing performed by each functional unit provided in processing device 10 will be described hereinafter.

Figure 3:
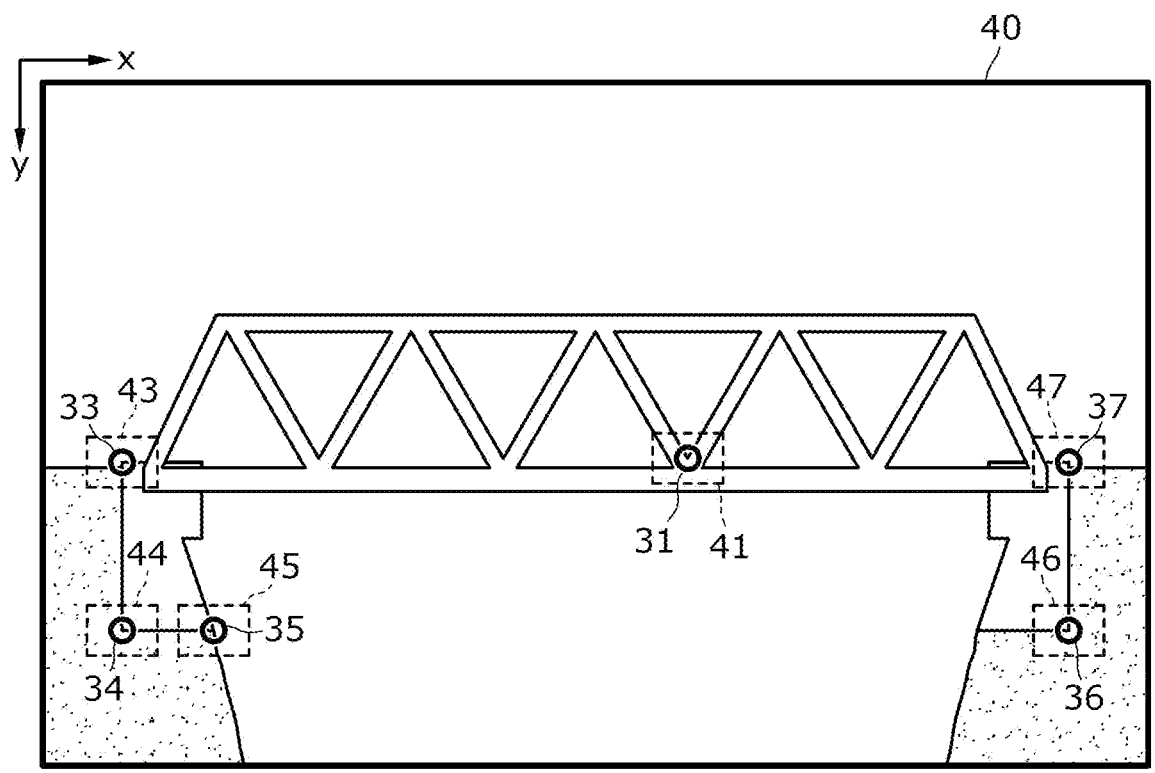
FIG. 3 is a descriptive diagram illustrating a first example of a shot image according to the embodiment.

FIG. 3 is a descriptive diagram illustrating image 40, which is the first example of a shot image, according to the present embodiment. Image 40 is an example of an image generated by camera 21 during the training period. Assume that bridge 1 is stationary, and camera 21 is vibrated by vibration devices 25 and 26, when shooting image 40. The position of bridge 1 in this case is also called a "normal position of bridge 1". Similarly, the positions of the target point and the reference point of bridge 1 in this case are also called a "normal position of the target point" and a "normal position of the reference point", respectively.

As illustrated in FIG. 3, bridge 1, target point 31, and reference points 33 to 37 appear in image 40. For example, in image 40, the right direction is taken as the x-axis positive direction and the downward direction is taken as the y-axis positive direction, but the directions are not limited thereto.

In image 40, target block 41 corresponds to target point 31. Reference blocks 43 to 47 correspond to reference points 33 to 37, respectively.

Note that where target point 31 and reference points 33 to 37 are set is determined through a suitable method. For example, target point 31 and reference points 33 to 37 may be set by presenting image 40 to the user and obtaining an instruction received from the user. Alternatively, target point 31 and reference points 33 to 37 may be obtained and used by inputting image 40 into a machine learning model that determines the appropriate target point and reference points using the image as an input.

Figure 4:
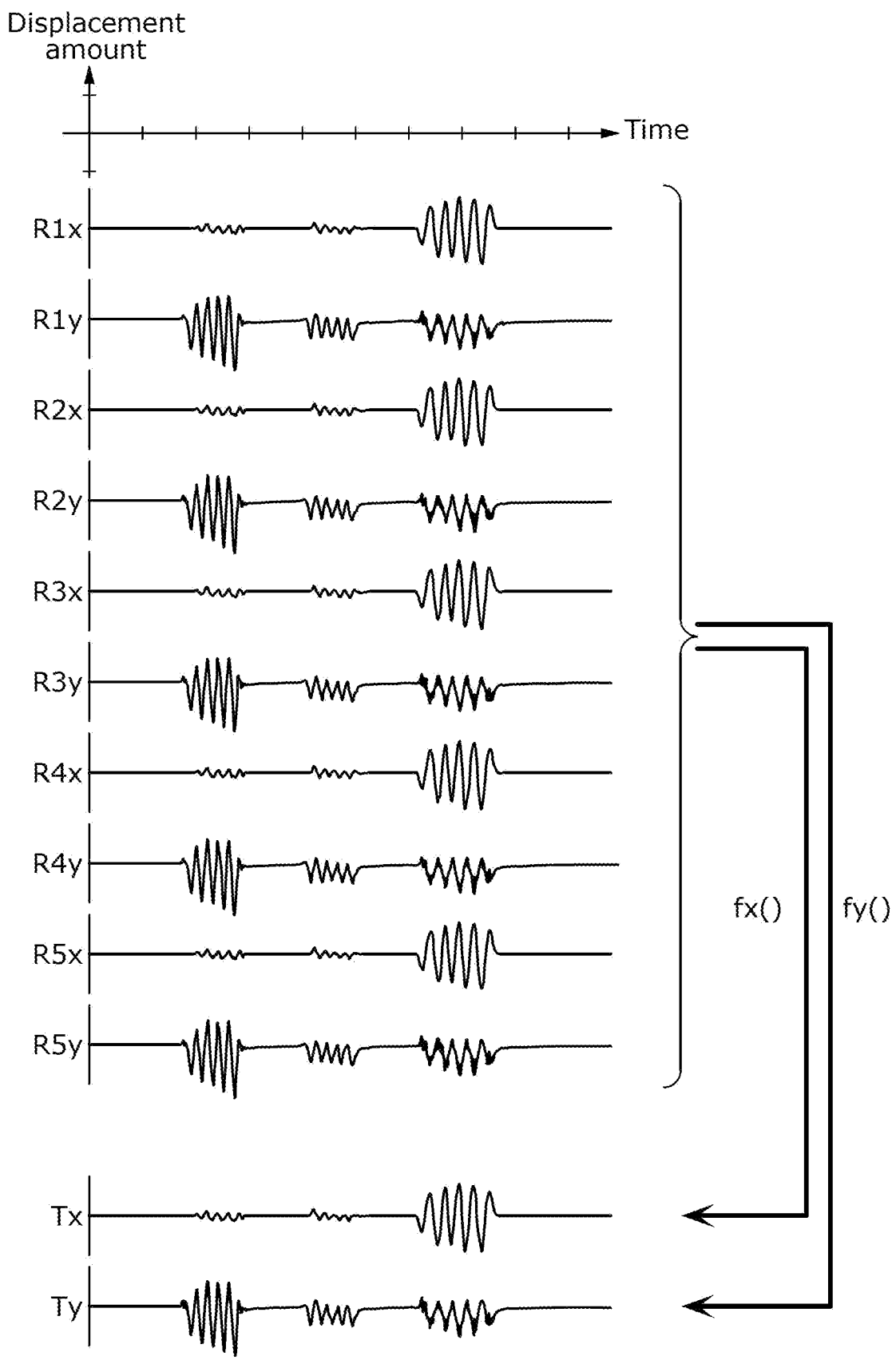
FIG. 4 is a descriptive diagram illustrating a method for generating a model according to the embodiment.

FIG. 4 is a descriptive diagram illustrating a method for generating model 15 according to the present embodiment.

FIG. 4 indicates graphs showing changes over time in the displacement amounts of each of reference blocks 43 to 47 and target block 41 in the training period. In each graph, the vertical axis represents the displacement amount, and the horizontal axis represents time. One tick on the vertical axis represents about one mm (or pixel), for example, and one tick on the horizontal axis represents about one second, for example, but the graphs are not limited thereto. The changes over time in the displacement amounts illustrated in FIG. 4 correspond to the positions of reference blocks 43 to 47 in all of the images generated by camera 21. The displacement amounts of reference blocks 43 to 47 and target block 41 illustrated in FIG. 4 are oscillating because camera 21 is vibrating during the shooting.

Displacement amount R1x in FIG. 4 indicates the displacement amount of reference block 43 in the x direction in image 40 (i.e., an x component of the displacement). Displacement amount R1y in FIG. 4 indicates the displacement amount of reference block 43 in the y direction in image 40 (i.e., a y component of the displacement).

Similarly, displacement amounts R2x, R2y, R3x, R3y, R4x, R4y, R5x, and R5y in FIG. 4 indicate displacement amounts of reference block 44 in the x direction and the y direction, displacement amounts of reference block 45 in the x direction and the y direction, displacement amounts of reference block 46 in the x direction and the y direction, and displacement amounts of reference block 47 in the x direction and the y direction, respectively.

Displacement amounts Tx and Ty in FIG. 4 indicate the displacement amounts of target block 41 in the x direction and the y direction, respectively, in image 40.

First, generator 12 generates model 15 that outputs displacement amount Tx using displacement amounts R1x to R5y as inputs. Model 15 is expressed, for example, by function fx in which displacement amounts R1x to R5y are independent variables and displacement amount Tx is a dependent variable (see Formula 1 below). Function fx may be expressed through any type of formula.

$$Tx = fx(R1x, R1y, R2x, R2y, R3x, R3y, R4x, R4y, R5x, R5y) \quad \text{(Formula 1)}$$

Generator 12 generates model 15 by specifically determining function fx using displacement amounts R1x to R5y indicated in FIG. 4.

Processing for generating model 15 will be described using, as an example, a case where function fx is represented by a linear combination of displacement amounts R1x to R5y, which are independent variables.

In this case, function fx is expressed by the following Formula 2.

$$Tx = p1 \times R1x + p2 \times R1y + p3 \times R2x + p4 \times R2y + p5 \times R3x + p6 \times R3y + p7 \times R4x + p8 \times R4y + p9 \times R5x + p10 \times R5y \quad \text{(Formula 2)}$$

Here, p1, p2, and so on up to p10 are coefficients independent of displacement amounts R1x to R5y and Tx and Ty.

Obtainer 11 obtains images, among the images generated by camera 21, that have a suitable time interval (e.g., about 0.01 to 0.1 seconds) as the plurality of training images. Generator 12 obtains displacement amounts R1x to R5y in the respective plurality of training images obtained by obtainer 11.

Next, generator 12 determines coefficients p1 to p10 through the least-squares method using displacement amounts R1x to R5y in the respective plurality of training images. The more values are obtained for displacement amounts R1x to R5y, the more accurately coefficients p1 to p10 can be determined.

Note that aside from the above-described function fx, various information indicating the relationship between displacement amounts R1x to R5y and displacement amount Tx can be used for model 15.

Generator 12 generates model 15 that outputs displacement amount Ty using displacement amounts R1x to R5y as inputs, in the same manner as the processing of generating model 15 described above. Model 15, which outputs displacement amount Ty, is expressed by function fy, in which, for example, displacement amounts R1x to R5y are independent variables and displacement amount Ty is a dependent variable, in the same manner as with displacement amount Tx. The specific method for determining function fy is the same as that for function fx.

In this manner, generator 12 generates model 15 that outputs displacement amounts Tx and Ty of target block 41 in image 40, using displacement amounts R1x to R5y of the plurality of reference blocks 43 to 47 in image 40 as inputs.

Figure 5:
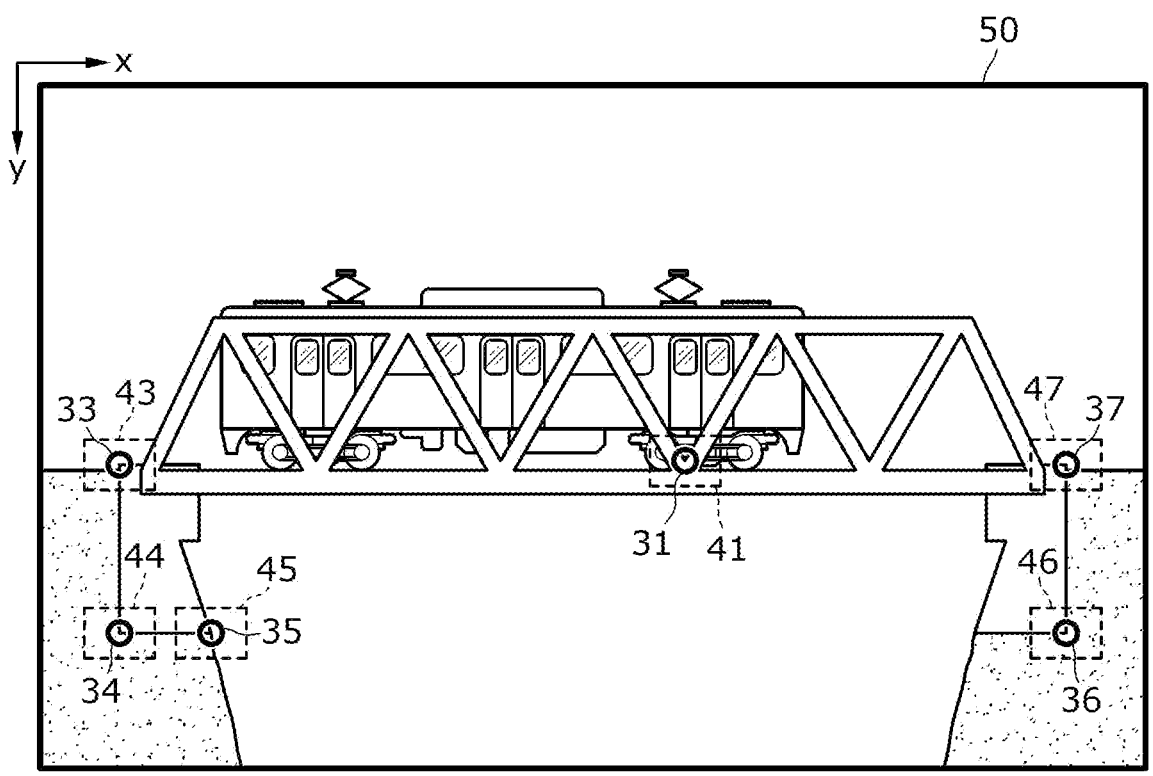
FIG. 5 is a descriptive diagram illustrating a second example of a shot image according to the embodiment.

FIG. 5 is a descriptive diagram illustrating image 50, which is a second example of a shot image, according to the present embodiment. Image 50 is an example of an image generated by camera 21 during the measurement period. When image 50 illustrated in FIG. 5 is being shot, target point 31 is being displaced downward from the normal position of target point 31 due to flexing in bridge 1 caused by an external force, produced by the presence of a train on bridge 1, acting on bridge 1 to push bridge 1 downward. As a result, target block 41 is assumed to be displaced in the y-axis positive direction in image 50. On the other hand, each of reference points 33 to 37 is assumed to be located in the normal position of that reference point (i.e., not displaced). Note that the downward displacement amount of bridge 1 is, for example, several mm (or pixels), but is not limited thereto.

As illustrated in FIG. 5, bridge 1, target point 31, and reference points 33 to 37 appear in image 50. Additionally, in the same manner as the case illustrated in FIG. 3, target block 41 and reference blocks 43 to 47 are set.

Outputter 13 obtains positions of target block 41 and reference blocks 43 to 47 in image 50 from obtainer 11. Meanwhile, outputter 13 obtains displacement amounts Tx and Ty of target block 41, which are output by inputting the positions of reference blocks 43 to 47 into model 15 generated by generator 12. Displacement amounts Tx and Ty of target block 41 obtained at this time indicate the displacement amounts of target block 41 when it is assumed that no external force is acting on bridge 1.

In actuality, a force pushing bridge 1 downward is acting as the external force due to the train traveling on bridge 1, and thus target block 41 is displaced in the y-axis positive direction from the position of target block 41 in the case of the stated assumption.

Outputter 13 outputs a value obtained by subtracting the displacement amount of target block 41 calculated using model 15 from the position of target block 41 obtained from obtainer 11 as the position of target block 41. The output value is a displacement amount in image 50 corresponding to the displacement amount of bridge 1 in the downward direction caused by the external force.

Figure 6:
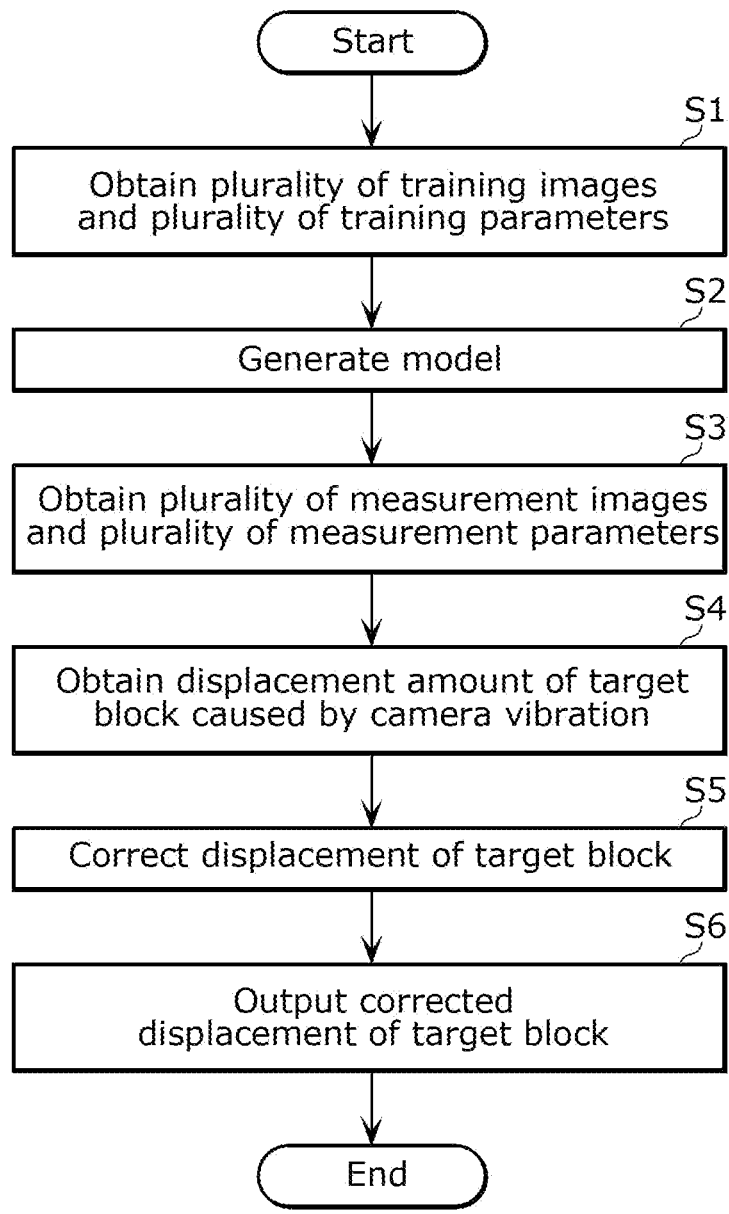
FIG. 6 is a flowchart illustrating processing for correcting a position of a target block according to the embodiment.

FIG. 6 is a flowchart illustrating processing for correcting the position of target block 41 according to the present embodiment.

In step S1, obtainer 11 obtains the plurality of training images and the plurality of training parameters from when corresponding ones of the plurality of training images are shot, during the training period.

In step S2, using the plurality of training images and the plurality of training parameters obtained by obtainer 11 in step S1, generator 12 generates model 15, which outputs the displacement amount, in each training image, of target block 41 corresponding to target point 31 appearing in each training image (i.e., the first displacement amount).

In step S3, obtainer 11 obtains the plurality of measurement images and the plurality of measurement parameters from when corresponding ones of the plurality of measurement images are shot, during the measurement period.

In step S4, outputter 13 obtains the displacement amount of target block 41 caused by vibration in camera 21 (i.e., the second displacement amount), using the measurement images and the plurality of measurement parameters obtained in step S3.

In step S5, outputter 13 corrects the displacement of target block 41 in the measurement image using the displacement amount of target block 41 obtained in step S4.

In step S6, outputter 13 outputs the displacement of target block 41 after the correction of step S5.

Through the above-described sequence of processing, processing device 10 can more appropriately measure displacement in a structure.

Note that the vibration of camera 21 by vibration devices 25 and 26 may be vibrations having a specific amplitude or a specific frequency. In this case, when obtainer 11 obtains the plurality of training parameters, of the oscillations in the position and the oscillations in the orientation of camera 21, oscillations in the position and oscillations in the orientation at the specific amplitude or the specific frequency may be extracted and obtained.

By doing so, even if oscillations different from the specific amplitude or the specific frequency arise in bridge 1 or camera 21 during the training period, generator 12 can generate model 15 without being affected by those oscillations.

Here, any amplitude or frequency can be used as the specific amplitude or the specific frequency, but in particular, a different amplitude or frequency from the amplitude or frequency of oscillations that can arise in bridge 1 may be used. This makes it possible to exclude vibrations occurring naturally in camera 21 from the processing for extracting oscillations of the specific amplitude or specific frequency, which has the advantage of making it possible to generate a more accurate model indicating the relationship between the target block and the reference blocks. Note that the amplitude or frequency of oscillations that can occur in bridge 1 can be calculated from the dimensions, weight, material, or strength of bridge 1, from the strength of wind on bridge 1, or the like.

Note that the reference point may be determined by selecting an appropriate reference point candidate from reference point candidates determined in advance. To be more specific, a plurality of reference point candidates may appear in each of the plurality of training images, and each of the plurality of training images may include a plurality of reference block candidates corresponding to the plurality of reference point candidates appearing in the training images. In this case, when generator 12 generates model 15, a plurality of trial models for model 15 are generated using a plurality of training images including, as the plurality of reference blocks, a plurality of trial reference block groups selected in a plurality of selection patterns from the plurality of reference block candidates. Generator 12 then generates the trial model, among the generated plurality of trial models, for which the output first displacement amount has the smallest degree of error, as model 15.

Variation 1

An information processing device and the like that more appropriately measures displacement in a structure will be described in the present variation, in terms of configurations different from the foregoing embodiment. The information processing device of the present variation more appropriately measures displacement in a structure using images generated by a plurality of cameras.

Figure 7:
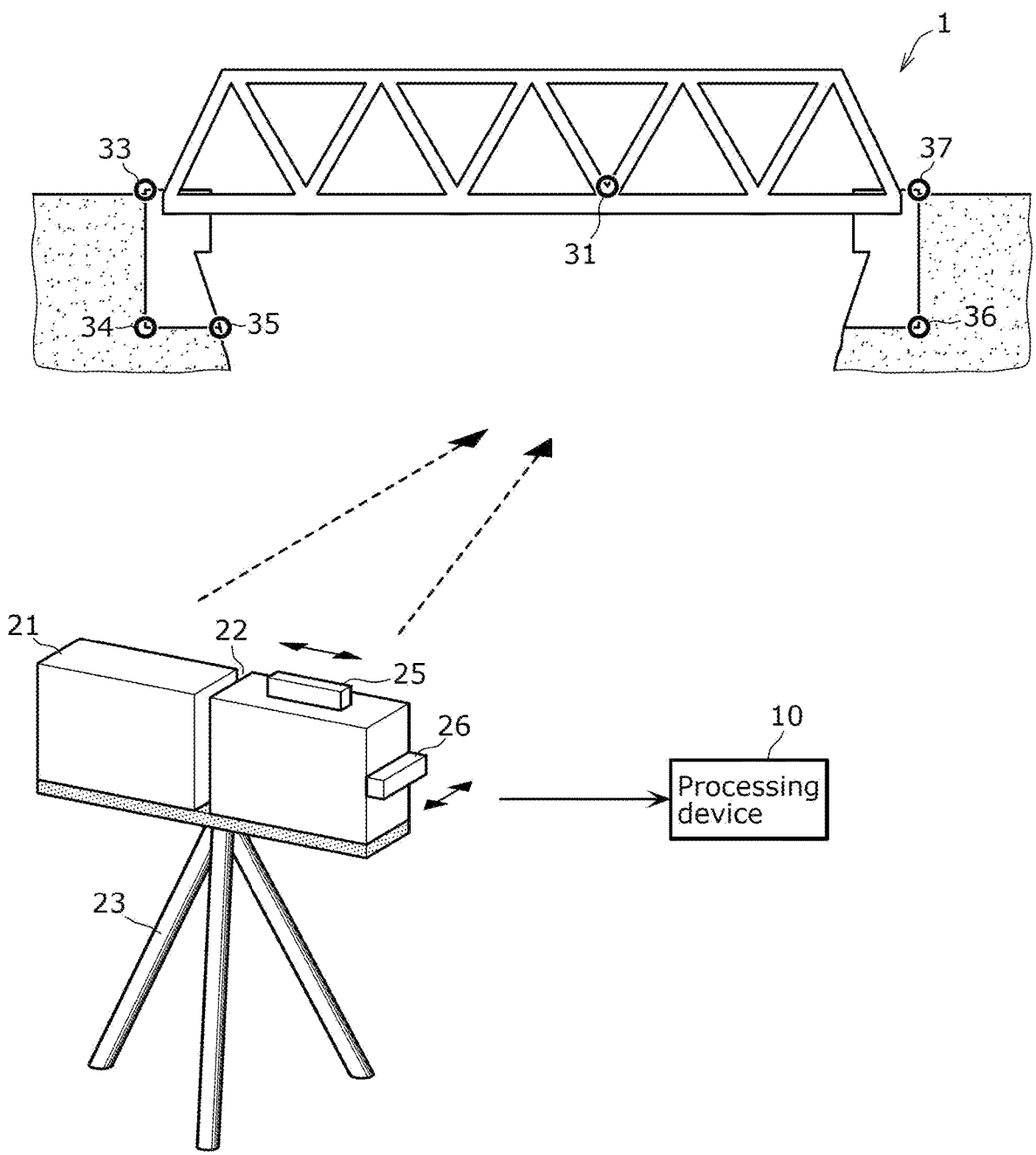
FIG. 7 is a schematic diagram illustrating the measurement of displacement in a structure by a processing device according to Variation 1 on the embodiment.

FIG. 7 is a schematic diagram illustrating the measurement of displacement in a structure by processing device 10 according to the present variation.

FIG. 7 illustrates bridge 1, cameras 21 and 22 that shoot images of bridge 1 from a distance, and processing device 10.

Bridge 1 is the same as in the foregoing embodiment.

Cameras 21 and 22 are cameras corresponding to camera 21 according to the foregoing embodiment. Cameras 21 and 22 provide the generated images to processing device 10.

Cameras 21 and 22 are both supported by tripod 23. Cameras 21 and 22 are fixed so that their relative positions do not change. Accordingly, when an external force acts on camera 21 or 22 or tripod 23, the positions and orientations of cameras 21 and 22 as a whole change. Cameras 21 and 22 also shoot simultaneously. Image capturing parameters (lenses, F values, focal lengths, shutter speeds, and the like) of cameras 21 and 22 may be different. The resolutions of images generated by cameras 21 and 22 may also be different. Camera 21 corresponds to a first camera, and camera 22 corresponds to a second camera.

Vibration devices 25 and 26 are fixedly installed in cameras 21 and 22. Although FIG. 7 illustrates vibration devices 25 and 26 as being installed in camera 22, vibration devices 25 and 26 may be installed in camera 21, or vibration device 25 may be installed in camera 21 and vibration device 26 may be installed in camera 22. If there are three or more vibration devices, any desired number of vibration devices may be installed in camera 21 or 22.

Target point 31 and the plurality of reference points 33 to 37 appear in the images generated by cameras 21 and 22. Here, target point 31 and the plurality of reference points 33 to 37 may be assigned to the image generated by camera 21 and the image generated by camera 22 in any way. A case where target point 31 appears in the image generated by camera 21, and the plurality of reference points 33 to 37 appear in the image generated by camera 22, will be described as an example here. The image generated by camera 22 corresponds to a third image. The plurality of measurement parameters include the positions of the plurality of reference blocks in the third image.

However, more generally speaking, the target point and "a" reference points may appear in the image generated by one of cameras 21 and 22, and (N−a) reference points may appear in the image generated by the other of cameras 21 and 22. Here, "N" represents the total number of the plurality of reference points, and "a" represents an integer at least 0 and no greater than N.

Although a case where cameras 21 and 22 are arranged facing the same direction, and both shoot bridge 1, will be described as an example, cameras 21 and 22 need not be facing the same direction. For example, camera 22 may be arranged facing a direction to shoot in a direction opposite from the direction in which camera 21 shoots.

Figure 8:
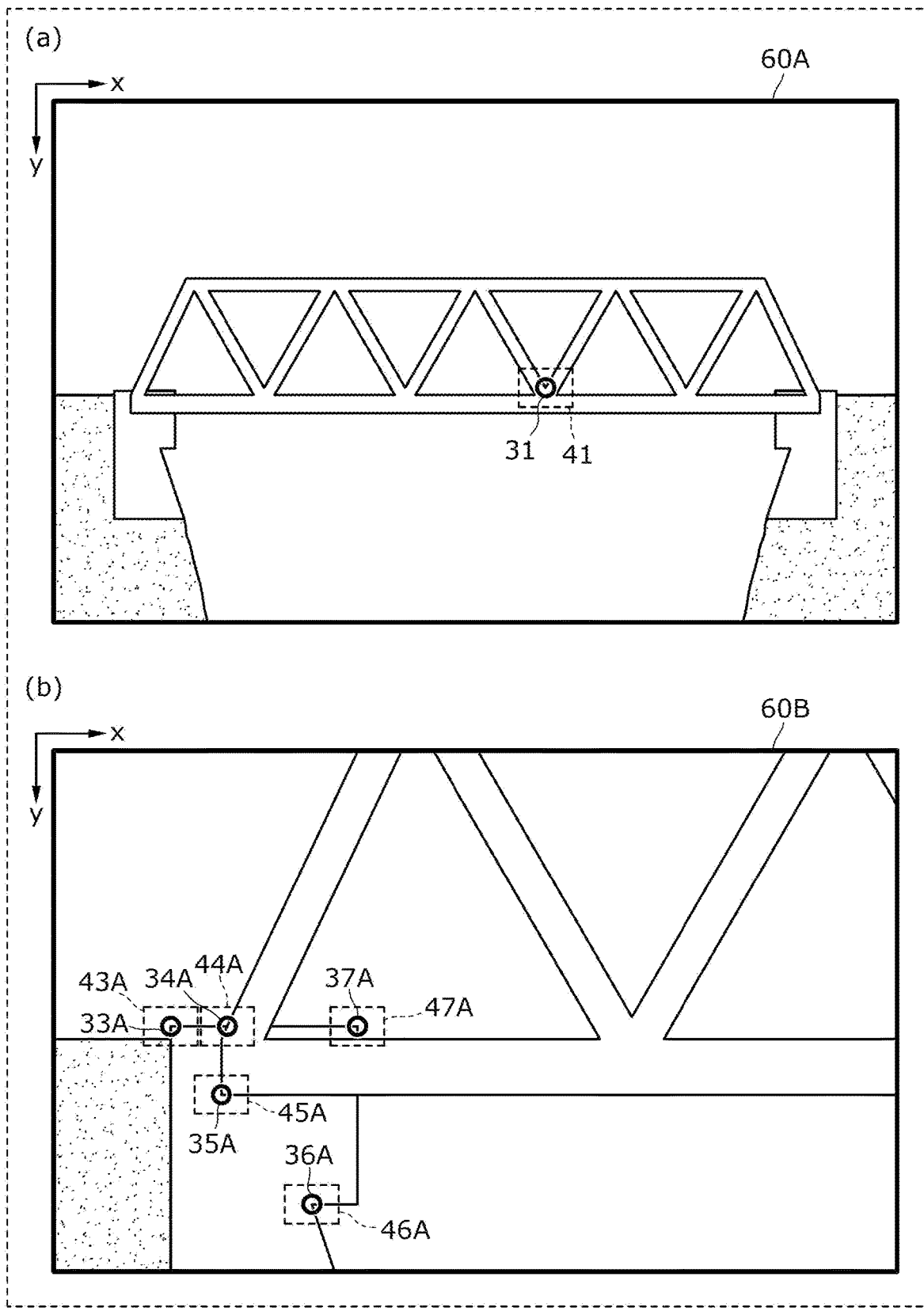
FIG. 8 is a schematic diagram illustrating examples of shot images according to Variation 1 on the embodiment.

FIG. 8 is a schematic diagram illustrating images 60A and 60B, which are examples of shot images, according to the present variation. Images 60A and 60B are examples of images generated by camera 21 during the training period.

Image 60A illustrated in (a) of FIG. 8 and image 60B illustrated in (b) of FIG. 8 are examples of images generated simultaneously by cameras 21 and 22, respectively. Image 60A and image 60B differ in terms of the scale of the subject appearing, based on differences between the lenses, the resolutions, or the like.

Target point 31 of bridge 1 appears in image 60A, and target block 41 corresponding to target point 31 is set.

Reference points 33A, 34A, 35A, 36A, and 37A of bridge 1 appear in image 60B, with reference blocks 43A to 47A, corresponding to reference points 33A to 37A, respectively, being set.

Obtainer 11 obtains positions of target block 41 and reference blocks 43A to 47A. Generator 12 generates model 15 using the positions of target block 41 and reference blocks 43A to 47A obtained by obtainer 11. Obtainer 11 then generates an image from the shooting performed by cameras 21 and 22 during the measurement period. Outputter 13 calculates the displacement amount of target block 41 using model 15, in the same manner as in the foregoing embodiment, using the image generated by obtainer 11, and outputs a value obtained by subtracting the stated displacement amount from the measured position of target block 41.

Note that FIG. 8 illustrates a case where the magnification of image 60A in which target point 31 is shot is relatively low, and the magnification of image 60B in which reference points 33A to 37A are shot is relatively high, as an example. The accuracy of the measurement of displacement of target point 31 can be increased by using such magnifications. However, the magnitudes of the magnifications are not limited to the example illustrated in FIG. 8. Specifically, a case where the magnification of image 60A in which target point 31 is shot is relatively high, and the magnification of image 60B in which reference points 33A to 37A are shot is relatively low, is also possible. The accuracy of the measurement of displacement of reference points 33A to 37A can be increased by using such magnifications, which makes it possible to reduce error in the measurement of target point 31.

Furthermore, the magnification of image 60A in which target point 31 is shot and the magnification of image 60B in which reference points 33A to 37A are shot may both be about the same as that of image 60B illustrated in (b) of FIG. 8. Doing so provides advantages in that the measurement accuracy is improved, as described above, and measurement error is also reduced.

Variation 2

An information processing device and the like that more appropriately measure displacement in a structure will be described in the present variation, in terms of configurations different from those of the foregoing embodiment and variation.

The information processing device according to the present variation more appropriately measures displacement in a structure using output values from sensors fixed to a camera as a plurality of parameters.

Figure 9:
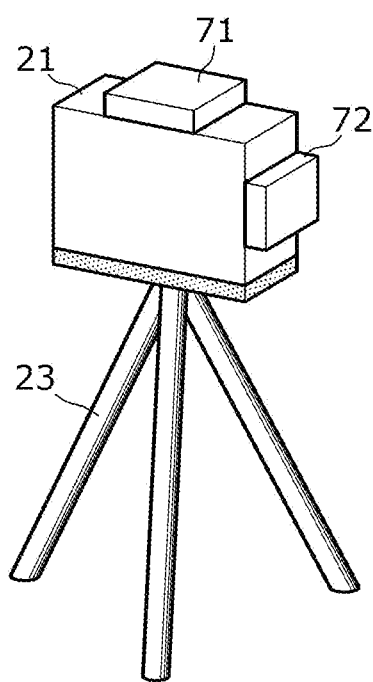
FIG. 9 is a schematic diagram illustrating a camera to which a sensor is fixed according to Variation 2 on the embodiment.

FIG. 9 is a schematic diagram illustrating camera 21 to which sensors 71 and 72 are fixed, according to the present variation.

As illustrated in FIG. 9, sensors 71 and 72 are fixedly installed in camera 21.

A case where sensor 71 is a displacement sensor and sensor 72 is a gyrosensor will be described as an example here. In other words, sensor 71 senses a displacement amount in the directions of three axes orthogonal to each other, for example, and outputs the sensed displacement amount. Sensor 72 senses an angular velocity about three axes orthogonal to each other, for example, and outputs the sensed angular velocity. Note that the type, number, or position of the sensors provided in camera 21 are not limited to those mentioned here.

When the position or orientation of camera 21 changes, the displacement amount and angular velocity output by sensors 71 and 72 change in response.

Obtainer 11 uses the output values output by sensor 71 and sensor 72, i.e., the displacement amount and the angular velocity, as parameters. In other words, obtainer 11 uses the displacement amount and angular velocity obtained during the training period as training parameters. Additionally, obtainer 11 uses the displacement amount and angular velocity obtained during the measurement period as measurement parameters.

In other words, the plurality of training parameters include displacement data or angular velocity data of camera 21 from when each of the plurality of training images is shot, the data being obtained from the output values of the displacement sensor or gyrosensor fixed to camera 21. Likewise, the plurality of measurement parameters include displacement data or angular velocity data of camera 21 from when the measurement image is shot, the data being obtained from the output values of the displacement sensor or gyrosensor.

Figure 10:
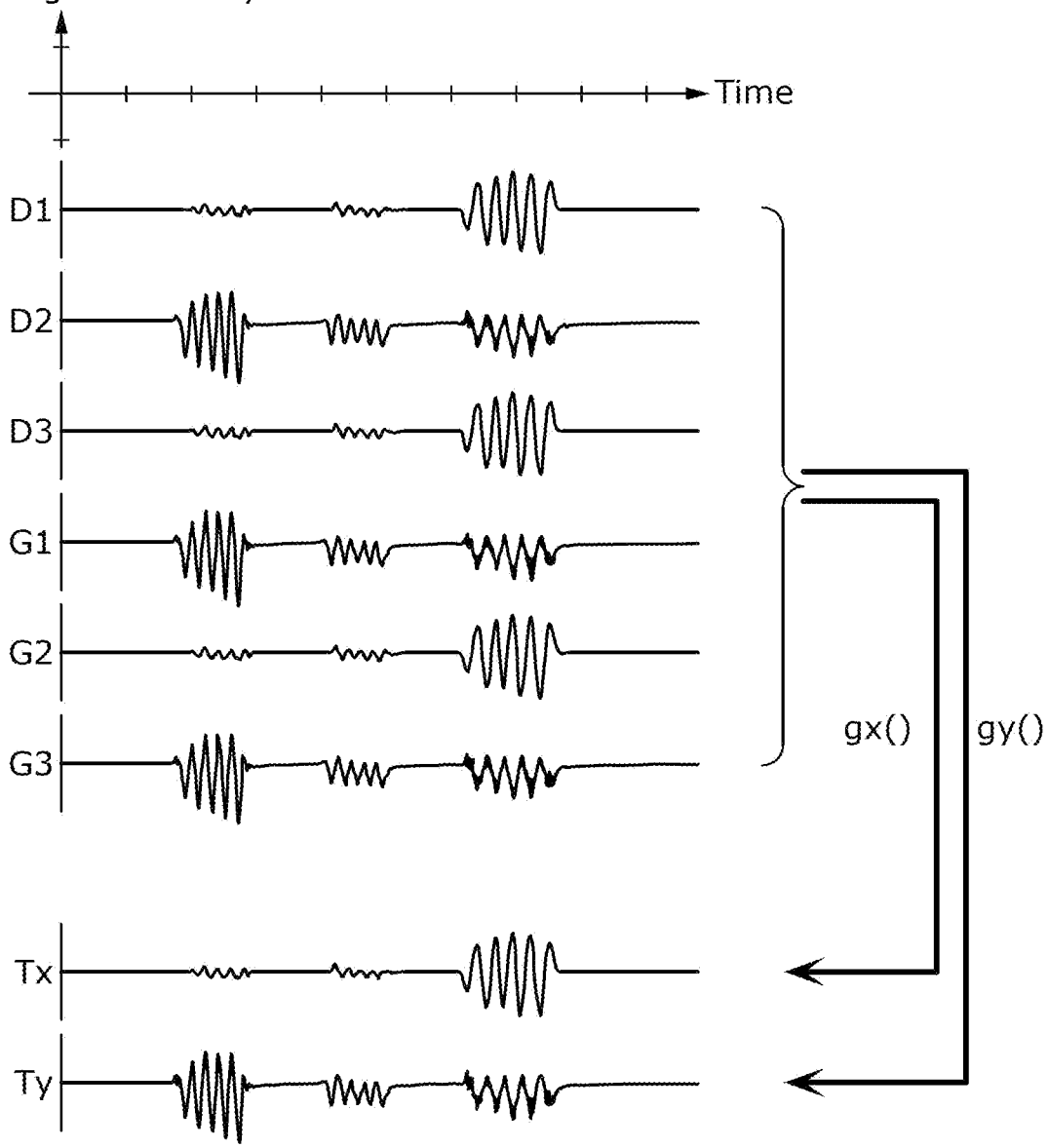
FIG. 10 is a descriptive diagram illustrating a method for generating a model according to Variation 2 on the embodiment.

FIG. 10 is a descriptive diagram illustrating a method for generating a model according to the present variation.

FIG. 10 illustrates changes over time in the respective output values from sensors 71 and 72 during the training period. In FIG. 10, the vertical axis represents the output value, and the horizontal axis represents time. One tick on the vertical axis represents about one mm for sensor 71, which is a displacement sensor, and about 1 deg/s for sensor 72, which is a gyrosensor, for example, and one tick on the horizontal axis represents about one second, for example, but the graphs are not limited thereto.

Displacement amounts D1, D2, and D3 in FIG. 10 indicate displacement amounts in the direction of each of the three axes, output by sensor 71. Angular velocities G1, G2, and G3 in FIG. 10 indicate angular velocities about each of the three axes, output by sensor 72.

In the same manner as the foregoing embodiment, generator 12 generates a model that outputs displacement amount Tx of the target block in the x direction, using displacement amounts D1, D2, and D3 and angular velocities G1, G2, and G3 as inputs. The model is represented by function gx, for example (see Formula 3).

$$Tx = gx(D1, D2, D3, G1, G2, G3) \quad \text{(Formula 3)}$$

Then, when function gx is represented by, for example, the linear combinations of time-integral values D4, D5, and D6 of displacement amounts D1, D2, and D3 and angular velocities G1, G2, and G3, respectively (see Formula 4), the model is generated by determining coefficient q1 and the like through the least-squares method.

$$Tx = q1 \times D1 + q2 \times D2 + q3 \times D3 + q4 \times D4 + q5 \times D5 + q6 \times D6 \quad \text{(Formula 4)}$$

Using the method described in the present variation makes it possible to correct the position of the target block based on changes in the position and orientation of camera 21, without using a reference block.

Variation 3

A processing device that more appropriately measures the position of a structure will be described in the present variation.

The processing device of the present variation more appropriately measures the position of a structure by performing processing similar to the processing for measuring the displacement in a structure according to the foregoing embodiment.

The processing device according to the present variation differs from the processing device according to the foregoing embodiment in terms of the processing by outputter 13. The processing by obtainer 11 and generator 12 is similar to that by processing device 10 according to the foregoing embodiment, and will therefore not be described here.

In the present variation, outputter 13 of the processing device obtains a second displacement amount, in a measurement image, of a target block corresponding to a target point appearing in the measurement image, the second displacement amount being output by inputting a plurality of measurement parameters into model 15, and outputs a position obtained by subtracting the second displacement amount from the position of the target block in the measurement image.

By doing so, the processing device according to the present variation can more appropriately measure the position of a structure.

In the foregoing embodiment and variations, the constituent elements are constituted by dedicated hardware. However, the constituent elements may be realized by executing software programs corresponding to those constituent elements. Each constituent element may be realized by a program executing unit such as a CPU or a processor reading out and executing a software program recorded into a recording medium such as a hard disk or semiconductor memory. Here, the software that realizes the information processing device and the like according to the foregoing embodiment and variations is a program such as that described below.

In other words, this program is a program that causes a computer to execute an information processing method, the information processing method including: obtaining a plurality of first images generated by a camera shooting a target point from a plurality of positions and orientations, and a plurality of first parameters related to a position and an orientation of the camera when shooting each of the plurality of first images; generating, using the plurality of first parameters as inputs, a model that outputs a first displacement amount by which a target block corresponding to the target point appearing in each of the plurality of first images is displaced from a reference position in the plurality of first images; obtaining a plurality of second images generated by the camera shooting the target point, and a plurality of second parameters related to a position and an orientation of the camera when shooting each of the plurality of second images; obtaining a second displacement amount by which a target block corresponding to the target point appearing in the plurality of second images is displaced from a reference position in the plurality of second images, the second displacement amount being output by inputting the plurality of second parameters for corresponding ones of the plurality of second images into the model; and outputting a displacement obtained by subtracting the second displacement amount from displacement of the target block in the plurality of second images.

An information processing device and the like according to one or more aspects have been described based on embodiments, but the present disclosure is not limited to these embodiments. Variations on the embodiments conceived by one skilled in the art, embodiments implemented by combining constituent elements from different other embodiments, and the like may be included in the scope of one or more aspects as well, as long as they do not depart from the essential spirit of the present disclosure.

INDUSTRIAL APPLICABILITY

The present disclosure can be used in measurement devices that measure displacement in a structure.

The invention claimed is:

1. An information processing method comprising:
obtaining a plurality of first images generated by a camera shooting a target point from a plurality of positions and orientations, and a plurality of first parameters related to a position and an orientation of the camera when shooting each of the plurality of first images;
generating, using the plurality of first parameters as inputs, a model that outputs a first displacement amount by which a target block corresponding to the target point appearing in each of the plurality of first images is displaced from a reference position in the plurality of first images;
obtaining a plurality of second images generated by the camera shooting the target point, and a plurality of second parameters related to a position and an orientation of the camera when shooting each of the plurality of second images;
obtaining a second displacement amount by which a target block corresponding to the target point appearing in the plurality of second images is displaced from a reference position in the plurality of second images, the second displacement amount being output by inputting the plurality of second parameters for corresponding ones of the plurality of second images into the model; and
outputting a displacement obtained by subtracting the second displacement amount from displacement of the target block in the plurality of second images.

2. The information processing method according to claim 1,
wherein a plurality of reference points appear in each of the plurality of first images,
each of the plurality of first images includes a plurality of reference blocks corresponding one-to-one to the plurality of reference points appearing in the first image,
the plurality of first parameters include a displacement of the plurality of reference blocks in the plurality of first images,
the plurality of reference points appear in the plurality of second images,
each of the plurality of second images includes a plurality of reference blocks corresponding to the plurality of reference points appearing in the second image, and
the plurality of second parameters include a displacement of the plurality of reference blocks in the plurality of second images.

3. The information processing method according to claim 2,
wherein a plurality of reference point candidates appear in each of the plurality of first images,
each of the plurality of first images includes a plurality of reference block candidates corresponding to the plurality of reference point candidates appearing in the first image, and
the generating of the model includes:
generating a plurality of trial models for the model using the plurality of first images including, as the plurality of reference blocks, a plurality of trial reference block groups selected in a plurality of selection patterns from the plurality of reference block candidates; and
generating a trial model, among the plurality of trial models generated, having a smallest degree of error in the first displacement amount output, as the model.

4. The information processing method according to claim 1,
wherein the plurality of first parameters include displacement data or angular velocity data of the camera obtained when the camera shoots each of the plurality of first images, the displacement data or the angular velocity data being obtained from an output value of a displacement sensor or a gyrosensor fixed to the camera, and
the plurality of second parameters include displacement data or angular velocity data of the camera obtained when the camera shoots the plurality of second images, the displacement data or the angular velocity data being obtained from an output value of the displacement sensor or the gyrosensor.

5. The information processing method according to claim 1,
wherein when obtaining the plurality of first images, the plurality of first images are obtained by the camera by generating the plurality of first images by sequentially shooting the target point when the position of the camera is changing within a predetermined distance from the reference position or when the orientation of the camera is changing within a predetermined angle from a reference orientation.

6. The information processing method according to claim 5,
wherein when generating the plurality of first images, the plurality of first images are generated by sequentially shooting the target point while the position and the orientation of the camera are oscillating.

7. The information processing method according to claim 6,
wherein the plurality of first images are generated by applying a vibration to the camera using a vibration device fixed to the camera and shooting the target point when the position and the orientation of the camera are oscillating based on the vibration applied to the camera.

8. The information processing method according to claim 7,
wherein when applying the vibration to the camera, the vibration device applies a vibration including a component of movement in three directions orthogonal to each other and a component of rotation about three axes orthogonal to each other.

9. The information processing method according to claim 7,
wherein when obtaining the plurality of first parameters, the plurality of first parameters are obtained when the vibration device is applying the vibration to the camera, without obtaining the plurality of first parameters when the vibration device is not applying the vibration to the camera.

10. The information processing method according to claim 7,
wherein when the vibration is applied to the camera by the vibration device, a vibration having a specific amplitude or a specific frequency is applied, and
when obtaining the plurality of first parameters, of oscillations in the position and oscillations in the orientation of the camera, oscillations in the position and oscillations in the orientation at the specific amplitude or the specific frequency are extracted and obtained.

11. The information processing method according to claim 1,
wherein a plurality of reference points appear in a plurality of third images shot by a second camera having a position and an orientation that change together with the position and the orientation of a first camera, the first camera being the camera, and the plurality of third images being shot simultaneously with the plurality of first images shot by the first camera,
each of the plurality of third images includes a plurality of reference blocks corresponding one-to-one to the plurality of reference points appearing in the third image,
the plurality of parameters include positions of the plurality of reference blocks in the third image,
the plurality of reference points appear in the plurality of second images,
each of the plurality of second images includes a plurality of reference blocks corresponding to the plurality of reference points appearing in the second image, and
the plurality of second parameters include positions of the plurality of reference blocks in the second image.

12. An information processing method comprising:
obtaining a plurality of first images generated by a camera shooting a target point from a plurality of positions and orientations, and a plurality of first parameters related to a position and an orientation of the camera when shooting each of the plurality of first images;
generating, using the plurality of first parameters as inputs, a model that outputs a first displacement amount by which a target block corresponding to the target point appearing in each of the plurality of first images is displaced from a reference position in the plurality of first images;
obtaining a plurality of second images generated by the camera shooting the target point, and a plurality of second parameters related to a position and an orientation of the camera when shooting each of the plurality of second images;
obtaining a second displacement amount by which a target block corresponding to the target point appearing in each of the second images is displaced from a reference position in the second image, the second displacement amount being output by inputting the plurality of second parameters into the model; and
outputting a position obtained by subtracting the second displacement amount from a position of the target block in the plurality of second images.

13. An information processing device comprising:
an obtainer;
a generator; and
an outputter,
wherein the obtainer obtains a plurality of first images generated by a camera shooting a target point from a plurality of positions and orientations, and a plurality of first parameters related to a position and an orientation of the camera when shooting each of the plurality of first images;
the generator generates, using the plurality of first parameters as inputs, a model that outputs a first displacement amount by which a target block corresponding to the target point appearing in each of the plurality of first images is displaced from a reference position in the plurality of first images;
the obtainer further obtains a second image generated by the camera shooting the target point, and a plurality of second parameters related to a position and an orientation of the camera when shooting the second image; and
the outputter obtains a second displacement amount by which a target block corresponding to the target point appearing in the plurality of second images is displaced in the plurality of second images, the second displacement amount being output by inputting the plurality of second parameters into the model, and outputs a displacement obtained by subtracting the second displacement amount from a displacement of the target block in the plurality of second images.

14. An information processing system comprising:

the information processing device according to claim 13;

the camera that generates the plurality of first images and the plurality of second images; and a vibration device that is fixed to the camera and that applies a vibration to the camera.

* * * * *